United States Patent
Kiefer

(10) Patent No.: US 9,283,891 B1
(45) Date of Patent: Mar. 15, 2016

(54) ALERT SYSTEMS AND METHODS USING A TRANSPARENT DISPLAY

(71) Applicant: GM GLOBAL TECHNOLOGY OPERATIONS LLC, Detroit, MI (US)

(72) Inventor: Raymond J. Kiefer, Huntington Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/497,856

(22) Filed: Sep. 26, 2014

(51) Int. Cl.
*B60Q 9/00* (2006.01)
*B60Q 1/00* (2006.01)

(52) U.S. Cl.
CPC .............. *B60Q 9/008* (2013.01); *B60Q 1/0023* (2013.01)

(58) Field of Classification Search
USPC ........................................................ 701/431
See application file for complete search history.

(56) References Cited

U.S. PATENT DOCUMENTS

| 7,928,862 | B1 * | 4/2011 | Matthews ...................... 340/946 |
| 8,462,204 | B2 * | 6/2013 | Schofield et al. ............. 348/115 |
| 8,503,729 | B2 * | 8/2013 | Kumagai ....................... 382/104 |
| 8,633,811 | B2 * | 1/2014 | Ikeda et al. .................... 340/441 |
| 2003/0108222 | A1 * | 6/2003 | Sato et al. ...................... 382/104 |
| 2007/0067089 | A1 * | 3/2007 | Yoshida .......................... 701/96 |
| 2010/0194602 | A1 * | 8/2010 | Engels et al. ................. 340/979 |
| 2012/0140070 | A1 * | 6/2012 | De Mers et al. .............. 348/144 |
| 2015/0015573 | A1 * | 1/2015 | Burtzlaff et al. .............. 345/419 |

* cited by examiner

*Primary Examiner* — Thomas Tarcza
*Assistant Examiner* — Alex C Dunn
(74) *Attorney, Agent, or Firm* — Ingrassia Fisher & Lorenz, P.C.

(57) ABSTRACT

Methods and systems are provided for alerting a driver of a vehicle having a transparent conformal display unit. In one embodiment, a method includes: detecting that an object is located in proximity to the vehicle based on sensor data; determining at least one of a time and a distance associated with the detected object based on vehicle conditions; generating an image that illustrates the at least one of time and distance based on vehicle conditions; and selectively generating a display signal to display the image on a transparent display of the vehicle through the transparent conformal display unit.

17 Claims, 8 Drawing Sheets

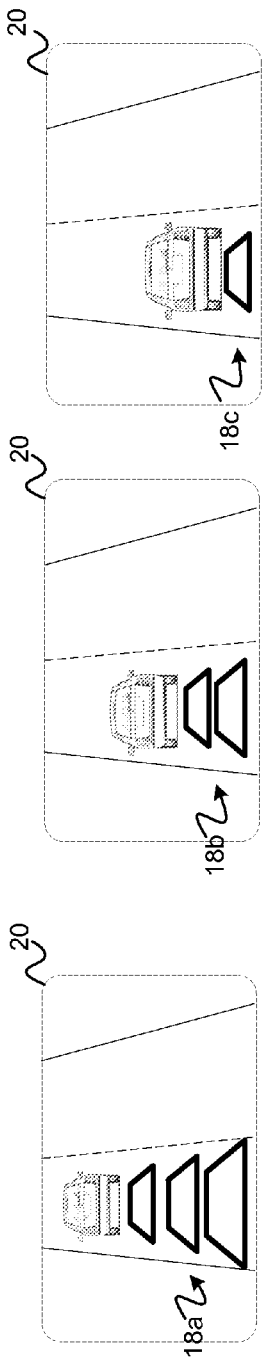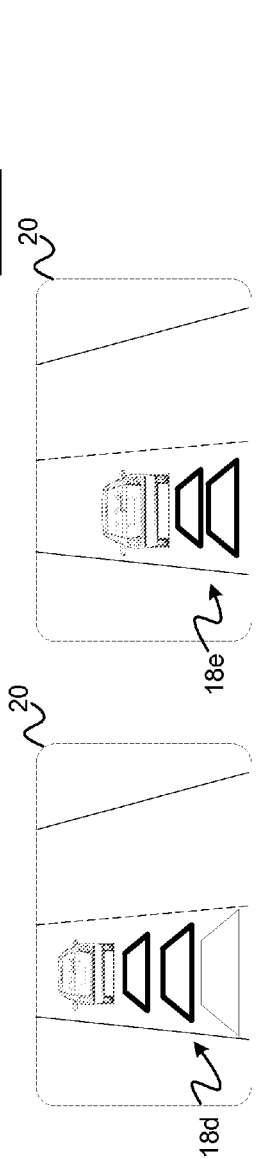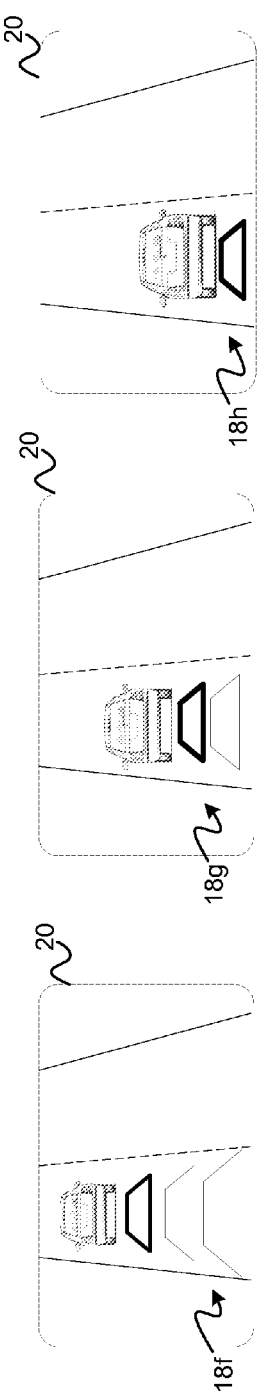

ALERT SYSTEMS AND METHODS USING A TRANSPARENT DISPLAY

TECHNICAL FIELD

The technical field generally relates to alert systems of a vehicle, and more particularly relates to alert systems of a vehicle that display information on a windshield display.

BACKGROUND

Vehicles include alert systems that detect objects or conditions in proximity to the vehicle and alert the driver to the object or condition. The alerts are typically generated based on the location and path of the detected object relative to that of the location and path of the driver's vehicle. Forward collision alert systems, for example, use sensors to detect vehicles or other objects in front of the vehicle projected to be in their path within a potentially dangerous time (e.g., seconds away if current conditions continue) or distance. Forward collision alert systems typically generate warnings or alerts, for example, when the vehicle is following another vehicle too closely or when the vehicle is approaching too rapidly to another vehicle or object.

A timing of the occurrence of the warnings may be configured by the driver. For example, the driver may be presented with one or more options. The options may be presented to the driver via spoken commands (e.g., "far", "medium", or "near") and/or an abstract visual display (e.g., two vehicles separated by 3, 2, or 1 radar wave(s)). In some cases, the driver may have difficulty understanding the implications of the options in order to make a well-informed selection. In other cases, the driver may have difficulty understanding an issued warning or alert once an option has been selected.

Accordingly, it is desirable to provide methods and systems that allow the driver to configure the timing in a manner that is easily understood by the driver. It is further desirable to provide methods and systems to alert or warn the driver in a manner that is easily understood by the driver. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for alerting a driver of a vehicle having a transparent conformal display unit. In one embodiment, a method includes: detecting that an object is located in proximity to the vehicle based on sensor data; determining at least one of a time and a distance associated with the detected object based on vehicle conditions; generating an image that illustrates the at least one of time and distance based on vehicle conditions; and selectively generating a display signal to display the image on a transparent display of the vehicle through the transparent conformal display unit.

In another embodiment, a method includes: detecting that an object is located in proximity to the vehicle based on sensor data; and in response to the object being detected, generating a conformal image based on vehicle conditions, and selectively generating a display signal to display the conformal image on a transparent display of the vehicle through the transparent conformal display unit.

In still another embodiment, a vehicle includes a transparent conformal display unit, and a control module. The control module detects an object in proximity to the vehicle, determines at least one of a time and a distance associated with the detected object based on vehicle conditions, that generates a conformal image that illustrates the at least one of time and distance based on vehicle conditions, and selectively generates a display signal to display the conformal image on a transparent display of the vehicle through the transparent conformal display unit.

DESCRIPTION OF THE DRAWINGS

The exemplary embodiments will hereinafter be described in conjunction with the following drawing figures, wherein like numerals denote like elements, and wherein:

FIGS. 2-6 are illustrations of an integrated display for displaying warnings or alerts in accordance with various embodiments;

DETAILED DESCRIPTION

Figure 1:
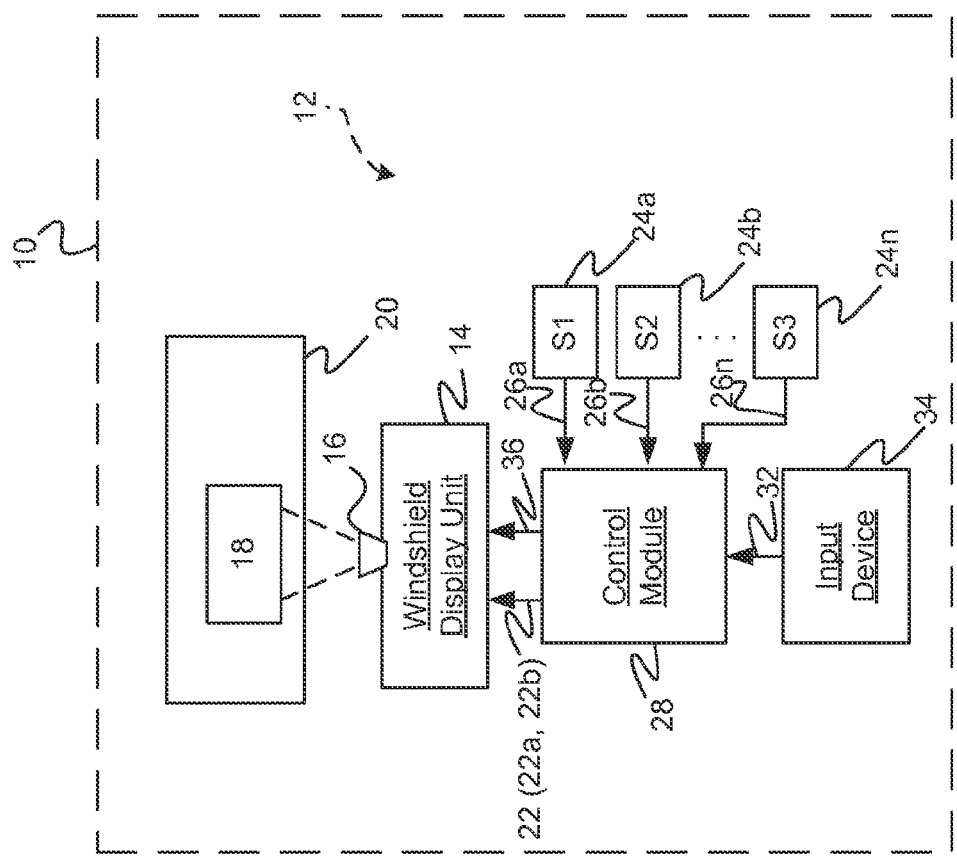
FIG. 1 is a functional block diagram illustrating a vehicle that includes an alert system in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle 10 is shown to include a vehicle alert system 12 in accordance with various embodiments. Although the figures shown herein depict an example with certain arrangements of elements, additional intervening elements, devices, features, or components may be present in actual embodiments. It should also be understood that FIG. 1 is merely illustrative and may not be drawn to any type of scale.

In various embodiments, the vehicle alert system 12 communicates visual warnings and/or alerts to a driver via a transparent conformal display unit 14. In various embodiments, the transparent conformal display unit 14 generally includes one or more projection devices 16 that project images 18 onto a transparent display such as a windshield 20 of the vehicle 10 (or other transparent surface in front of the driver). The images 18 are projected onto the transparent display such as the windshield 20 based on display signals 22 received from the vehicle alert system 12. As can be appreciated, the transparent conformal display unit 14 may present the images 18 to the driver using projection, reflection, or any other known methods for displaying images on a transparent display and is not limited to the present example.

The vehicle alert system 12 includes one or more sensors 24a-24n that sense observable conditions in proximity to the vehicle 10. The sensors 24a-24n can be image sensors, radar sensors, ultrasonic sensors, lidar sensors, GPS-based or wireless-based vehicle-to-vehicle sensors, or other sensors that sense observable conditions in proximity to the vehicle 10. The sensors 24a-24n sense the conditions of the vehicle 10 and generate sensor signals 26a-26n based thereon. A control module 28 receives the sensor signals 26a-26n, processes the sensor signals 26a-26n to detect an object in proximity to the vehicle 10, and selectively generates the display signals 22 for use by the transparent conformal display unit 14 to warn and/or alert the driver when an object is detected.

In various embodiments, the control module 28 processes the sensor signals 26a-26n based on current vehicle conditions. In particular, the control module 28, based on current and projected vehicle conditions, determines a level of threat to objects surrounding the vehicle. The control module 28 determines the level of threat by determining a "time-to-collision" or a "distance-to-collision" (i.e., the time or distance in which it is projected two vehicles or objects will collide) and/or a severity of the required maneuver by the driver or vehicle (e.g., hard braking) to avoid a collision.

The vehicle conditions may include conditions of the vehicles (e.g., vehicle speeds, vehicle decelerations, vehicle loads, etc.) and/or ambient conditions of the vehicle (e.g., road conditions, weather conditions, etc.) either current or projected. The vehicle conditions may be received from sensors 30, received from other control modules (not shown), determined by the control module 28, and/or predefined within the control module 28. Based on the determined time or distance with respect to a projected collision, the control module 28 selectively generates the display signals 22 for use by the transparent conformal display unit 14 to warn and/or alert the driver.

In various embodiments, the control module 28 selectively generates the display signals 22 based on an alert timing or alert distance at which the driver desires to receive the warnings and/or alerts. As will be discussed in more detail below, the desired time or distance can be predefined and/or can be configured by a user via user settings.

In various embodiments, the user settings may indicate a selected one of multiple options. FIGS. 2-4 illustrate exemplary embodiments having three options. As can be appreciated, various other embodiments can include any number of options and are not limited to the present examples. In the exemplary embodiments, the three options include a far option, (i.e., the user wishes to receive a warning when the detected object is within a first time or distance that is considered a "far collision threat" from the vehicle), a medium option (i.e., the user wishes to receive a warning when the detected object is within a second time or distance that is considered a "medium collision threat" from the vehicle), and a near option (i.e., the user wishes to receive a warning when the detected object is within a third time or distance that is considered a "near collision threat" from the vehicle).

The control module 28 generates the display signals 22 based on a comparison of the determined time or distance (given current vehicle conditions) to the time or distance defined by the selected option. The control module 28 generates the display signals 22 such that the image 18 is displayed on the windshield 20 illustrates the determined time or distance to the detected object. The control module 28 further generates the display signals 22 such that the image conforms to an environment that is viewed through the windshield 20 (referred to as a conformal image). In particular, the control module 28 calculates a position on the windshield 20 based on a determination of a driver eye, head, and/or face direction (e.g., with a face camera eye-tracker) and/or a determination of a driver eye, head, and/or face gaze location on the windshield 20 in combination with a determination of a location, size, and shape of elements in the external forward scene (e.g., roadway lane markings, roadway edges, path of roadway, 3-D trajectory of roadway, vehicles, vehicle sizes, license plates, etc.)

As shown in the exemplary embodiment of FIG. 2, when the exemplary far option is selected, and the determined time or distance is within a range defined by the far option, the image 18a is displayed on a position of the windshield and having a shape and size that, when viewed by the driver, appears to be within the lane the vehicle 10 is traveling and that illustrates the determined time or distance. In this example, the distance is illustrated by three trapezoids decreasing in size based on the distance from the vehicle 10. As can be appreciated, any other shapes, sizes, and/or number of shapes may be used to illustrate the time or distance in various embodiments.

As shown in FIG. 3, when the medium option is selected, and the determined time or distance is within the a range defined by the medium option, the image 18b is displayed on a position of the windshield 20 and having a shape and size that, when viewed by the driver, appears to be within the lane the vehicle 10 is traveling and that illustrates the determined time or distance. In this example, the distance is illustrated by two trapezoids decreasing in size based on the distance from the vehicle 10. As can be appreciated, any other shapes, sizes, and/or number of shapes may be used to illustrate the time or distance in various embodiments.

As shown in FIG. 4, when the near option is selected, and the determined time or distance is within a range defined by the near option, the image 18c is displayed on a position of the windshield 20 and having a shape and size that, when viewed by the driver, appears to be within the lane the vehicle is traveling and that illustrates the determined time or distance. In this example, the distance is illustrated by one trapezoid. As can be appreciated, any other shapes, sizes, and/or number of shapes may be used to illustrate the time or distance in various embodiments.

With reference back to FIG. 1, in various embodiments, the control module 28 may generate both warning display signals 22a and alert display signals 22b based on the selected option. For example, when the near and medium options are selected, the control module generates warning display signals 22a when the determined time or distance (given current vehicle conditions) is within the range defined by the options not selected (e.g., medium, or medium and far); and the control module 28 generates the alert displays signals 22b when the determined time or distance (given current vehicle conditions) is within the range defined by the selected option.

As shown in the exemplary embodiments of FIGS. 5A-5B, when the medium option is selected, and the determined time or distance is within the range defined by the not selected far option, a warning image 18d (FIG. 5A) is displayed that illustrates the determined time or distance. In this example, the distance is illustrated by three trapezoids, decreasing in size. Since the medium option was selected, only the trapezoids corresponding to the medium distance are highlighted. As the determined time or distance decreases and falls within the time or distance defined by the selected medium option, an alert image 18e (FIG. 5B) is displayed that illustrates the determined distance. Since the medium option was selected, each of the trapezoids is highlighted. Additionally or alternatively, a color, a size, or a shape of the trapezoids can be altered or the appearance of the shapes can flash at a rate to represent an alerting condition.

As shown in the exemplary embodiments of FIGS. 6A-6C, when the near option is selected, and the determined time or distance is within the range defined by the not selected far option, a warning image 18f (FIG. 6A) is displayed that illustrates the determined time or distance. In this case, the distance is illustrated by three trapezoids, decreasing in size. Since the near option was selected, only the trapezoids corresponding to the near distance are emphasized (e.g., highlighted, bolded, colored, etc.). As the determined time or distance decreases and falls within the range defined by the not selected medium option, another warning image 18g (FIG. 6B) is displayed that illustrates the determined time or distance. Since the near option was selected, only the trapezoids corresponding to the near time or distance are emphasized (e.g., highlighted, bolded, colored, etc.). As the determined time or distance further decreases and falls within the time or distance defined by the selected near option, an alert image 18h (FIG. 6C) is displayed that illustrates the determined time or distance. Since the near option was selected, the trapezoid is emphasized (e.g., highlighted, bolded, colored, etc.). Additionally or alternatively, a color, a size, or a shape of the trapezoid can be altered or the appearance of the shape can flash at a rate to illustrate an alert.

With reference back to FIG. 1, as previously discussed, the user settings may be predefined (e.g., factory supplied default settings) and/or may be configured by a driver of the vehicle 10. For example, user settings 32 may be entered by a user via a user input device 34. In various embodiments, options for selecting the user settings 32 may be presented to the user visually via the transparent conformal display unit 14 of the vehicle 10, and may be selected based on a user's interaction with the one or more user input devices 34 of the vehicle 10.

Figure 7:
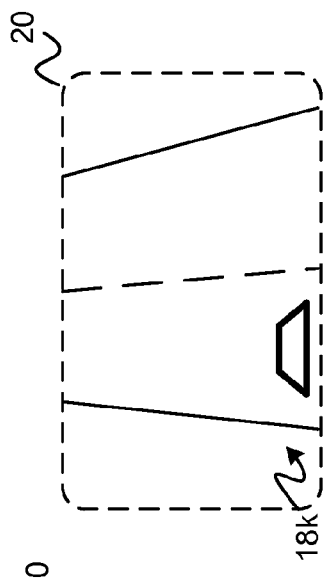
FIGS. 7-9 are illustrations of an integrated display for displaying options for selection in accordance with various embodiments.
Figure 8:
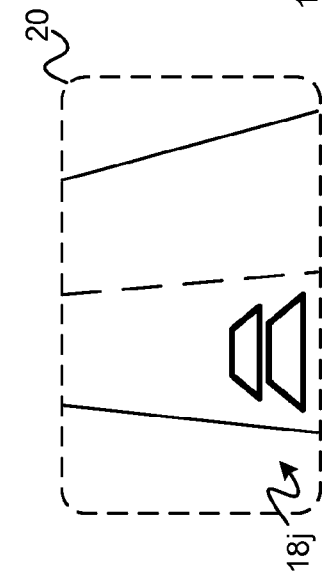
Figure 9:
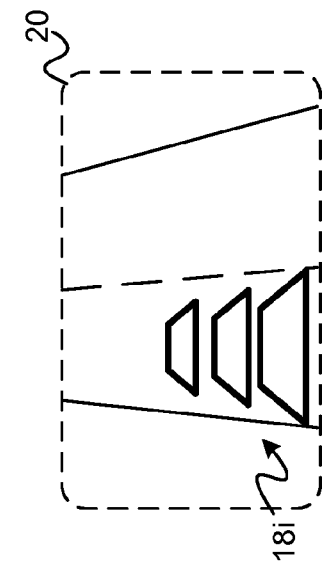

The control module 28 selectively generates display signals 36 to the transparent conformal display unit 14 to display the options. In the exemplary embodiments shown in FIGS. 7-9, the three options discussed above may be presented to the user (of course more or fewer options may be presented). FIG. 7 illustrates the far option discussed above. FIG. 8 illustrates the medium option discussed. FIG. 9 illustrates the near option discussed above. Each option includes an image 18i-18k that is displayed on the windshield 20 such that the image 18i-18k conforms to an environment that is viewed through the windshield 20. In the examples shown, the images 18i-18k are displayed on a position of the windshield 20 and having a shape and size that, when viewed by the driver, appear to be within the lane the vehicle 10 (FIG. 1) is traveling. The images 18i-18k are further displayed on the windshield 20 such that they illustrate a distance or time from an object in front of the vehicle 10 (FIG. 1) in which a warning or alert would be issued. As shown in the exemplary embodiment of FIG. 7, the image 18i includes three trapezoids that illustrate a distance from the vehicle 10 (FIG. 1). The distance is considered a far distance from the vehicle 10 (FIG. 1). When this option is selected, the control module 28 (FIG. 1) sets the user settings 32 (FIG. 1) to be a range of distances or times (e.g., 3 seconds time-to-collision, or other value) that is considered far from the vehicle 10 (FIG. 1).

As shown in the exemplary embodiments of FIG. 8, the image 18j includes two trapezoids that illustrate a distance from the vehicle 10 (FIG. 1). The distance is considered a medium distance from the vehicle 10 (FIG. 1). When this option is selected, the control module 28 (FIG. 1) sets the user settings 32 (FIG. 1) to a distance or time (e.g., 2.5 seconds time-to-collision, or other value) that is considered medium from the vehicle 10 (FIG. 1). As shown in the exemplary embodiments of FIG. 8, the image 18j includes one trapezoid displayed on the windshield 20 that illustrates a distance from the vehicle 10 (FIG. 1). The distance is considered a distance near the vehicle 10 (FIG. 1). When this option is selected, the control module 28 (FIG. 1) sets the user settings 32 to be a range of distances or times (e.g., 2 seconds time-to-collision, or other value) that is considered near the vehicle 10 (FIG. 1).

Referring now to FIGS. 10-14 and with continued reference to FIG. 1, flowcharts illustrate methods that can be performed by the alert system 12 of FIG. 1 to alert or warn a driver of the vehicle 10 in accordance with various embodiments. As can be appreciated in light of the disclosure, the order of operation within the method is not limited to the sequential execution as illustrated in FIGS. 10-14, but may be performed in one or more varying orders as applicable and in accordance with the present disclosure.

FIGS. 10-13 illustrate exemplary methods for generating the alerts and/or warnings. The exemplary methods generate alerts and warnings that include both a conformal image and an image that illustrates the determined time or distance. As can be appreciated, various other embodiments can generate alerts and warnings that include a conformal image or an image that illustrates the determined time or distance and are not limited to the present examples.

As can be appreciated, the methods of FIG. 10-13 may be scheduled to run at predetermined time intervals during operation of the vehicle 10 and/or may be scheduled to run based on predetermined events (e.g., when forward collision alert is enabled). In one example, a method may begin at 100. The sensor signals 26a-26n are received and processed at 110. It is determined from the processing whether an objected is detected in proximity to the vehicle 10 at 120. If an object is not detected in proximity to the vehicle 10 at 120, the method may end at 130.

If, however, an object is detected in proximity to the vehicle 10 at 120, vehicle condition data 31 indicating the vehicle conditions is received and processed at 140. The time or distance to the detected object is determined at 150 based on the vehicle conditions. The user settings 32 are retrieved at 160 and evaluated at 170-190.

For example, if the user settings 32 indicate that the far option was selected at 170, the display signals 22 are generated based on the determined time or distance and the range associated with the far option at 200. Thereafter, the method may end at 130. If, however, the user settings 32 do not indicate that the far option was selected at 170, rather the medium option was selected at 180, the display signals 22 are generated based on the determined time or distance and the range associated with the medium option at 210. Thereafter, the method may end at 130. If, however the user settings 32 do not indicate that the far option was selected at 170 or that the medium option was selected at 180, rather the user settings 32 indicate that the near option was selected at 190, the display signals 22 are generated based on the determined time or distance and the range associated with the near option at 220. Thereafter, the method may end at 130. If, however the user settings 32 do not indicate that the far option was selected at 170 or that the medium option was selected at 180, or that the near option was selected at 190, the display signals 22 are generated based on the determined time or distance and the range associated with a default option (e.g., the far option) at 220. Thereafter, the method may end at 130.

Figure 10:
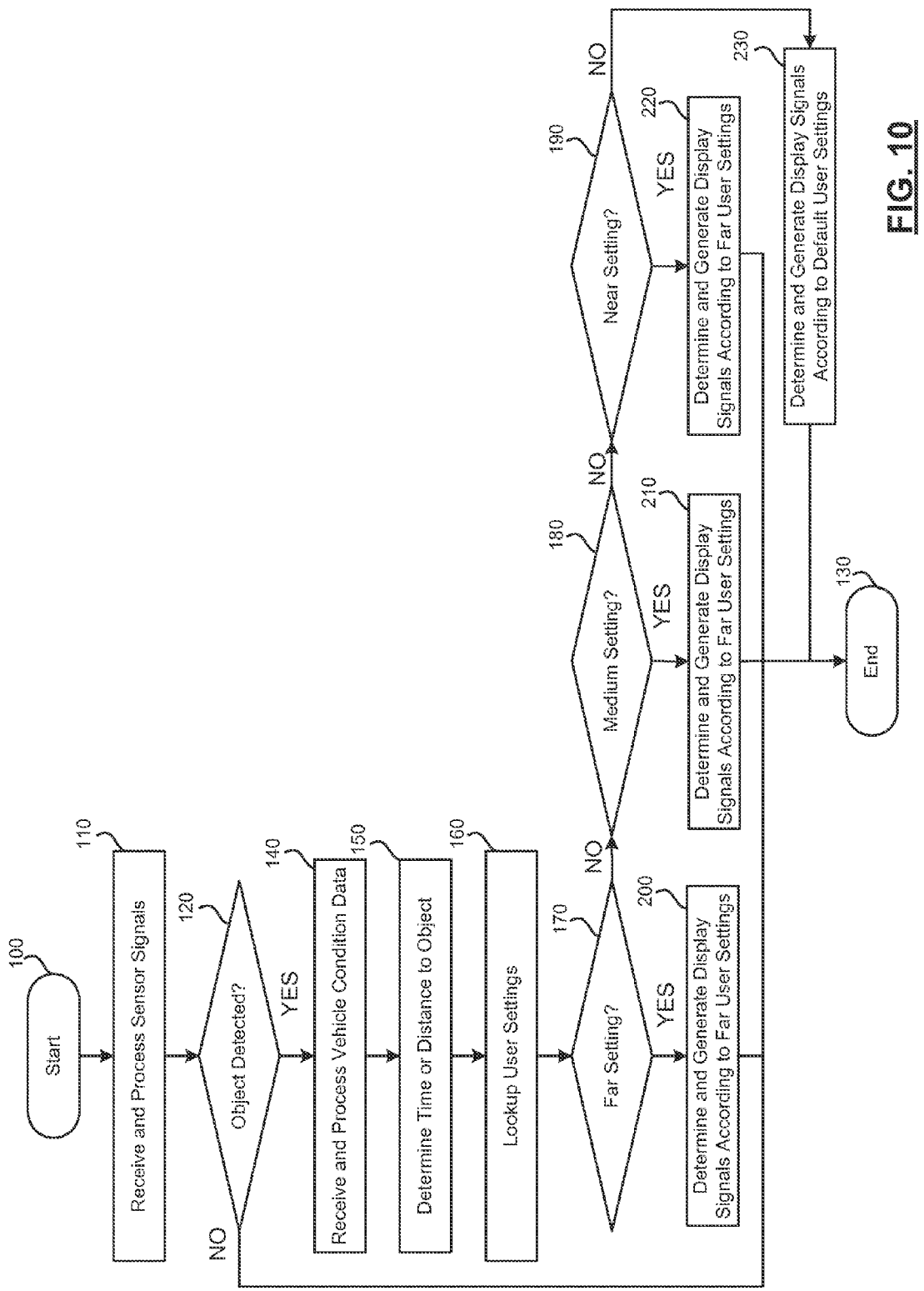
FIGS. 10-14 are flowcharts illustrating methods that may be performed by the alert system in accordance with various embodiments.
Figure 11:
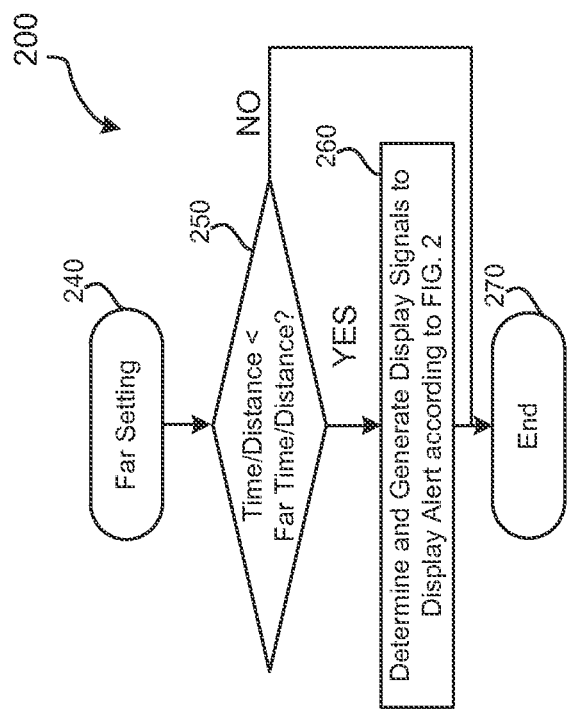

FIG. 11 illustrates an exemplary method for determining and generating display signals 22 according to the far option as described at 200 of FIG. 10. In one example, the method may begin at 240. The determined time or distance is compared to the time or distance associated with the far option at

250. If the determined time or distance is less than the time or distance associated with the far option at 250, the conformal image that illustrates the far time or distance (e.g., image 18*a* in FIG. 2) is generated and the alert display signals 22*b* are generated to alert the driver by displaying the conformal image 18*a* at 260. Thereafter, the method may end at 270.

If, however, the determined time or distance is greater than or equal to the time or distance associated with the far option at 250, no display signals are generated (i.e., no warnings or alerts are generated), and the method may end at 270.

Figure 12B:
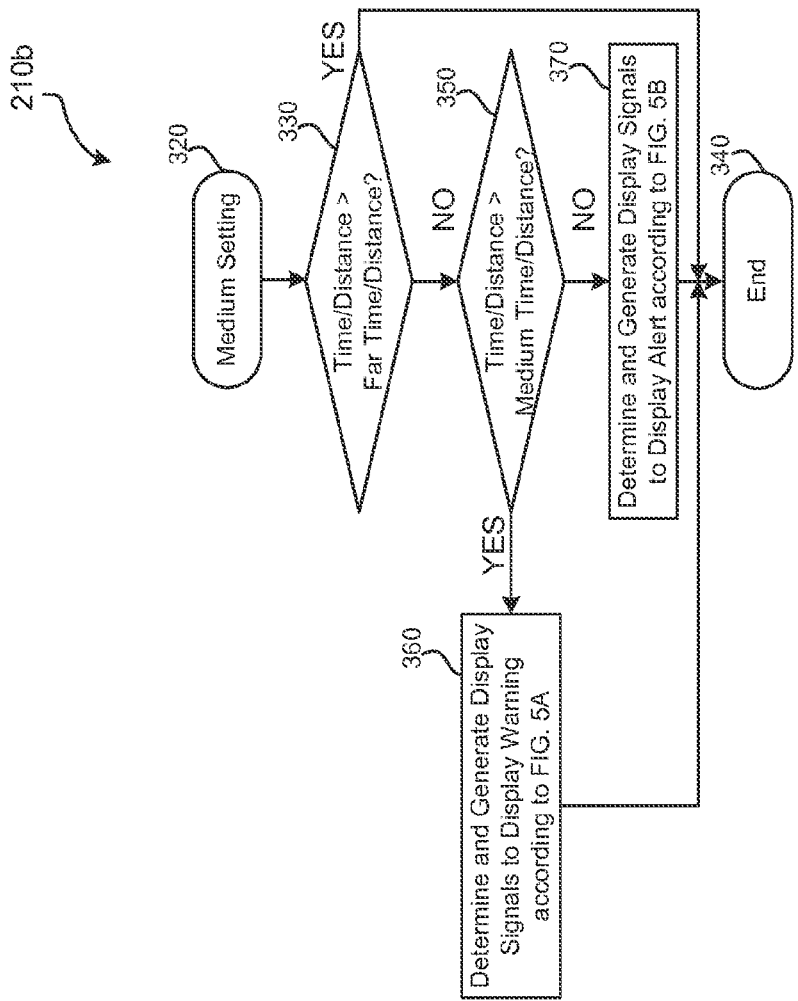
Figure 12A:
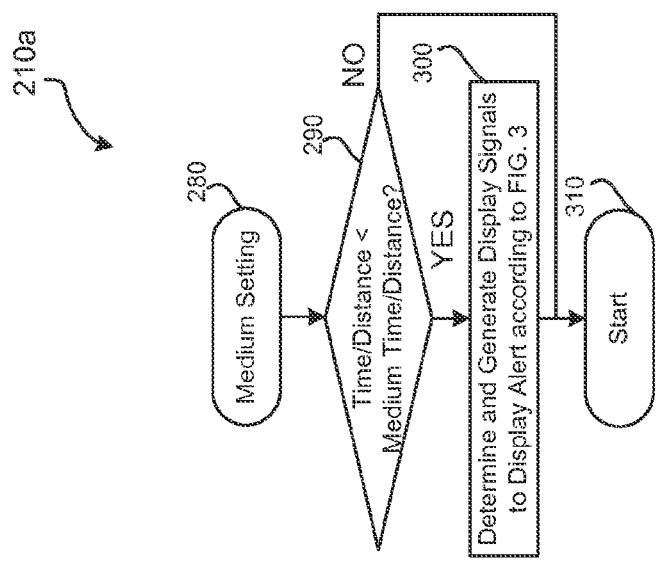

FIGS. 12A and 12B illustrate exemplary methods for determining and generating display signals 22 according to the medium option as described at 210 of FIG. 10. FIG. 12A illustrates a method 210*a* of generating alert signals 22*b*. In one example, the method 210*a* may begin at 280. The determined time or distance is compared to the time or distance associated with the medium option at 290. If the determined time or distance is less than the time or distance associated with the medium option at 290, the conformal image that illustrates the medium time or distance (e.g., image 18*b* in FIG. 3) is generated and the alert display signals 22*b* are generated to alert the driver by displaying the conformal image 18*b* at 300. Thereafter, the method may end at 310.

If, however, the determined time or distance is greater than or equal to the time or distance associated with the medium option at 290, no display signals are generated (i.e., no warnings or alerts are generated), and the method may end at 310.

FIG. 12B illustrates a method 210*b* of generating alert signals 22*b* and warning signals 22*a*. In one example, the method 210*b* may begin at 320. The determined time or distance is compared to the time or distance associated with the far option at 330. If the determined time or distance is greater than the time or distance associated with the far option at 330, no display signals are generated (i.e., no warnings or alerts are generated) and the method may end at 340. If, however, the determined time or distance is less than or equal to the time or distance associated with the far option at 330, the determined time or distance is compared to the time or distance associated with the medium option at 350. If the determined time or distance is greater than the time or distance associated with the medium option at 350, the conformal image that illustrates the far time or distance (e.g., image 18*d* in FIG. 5A) is generated and the warning display signals 22*a* are generated to warn the driver by displaying the conformal image 18*d* at 360. Thereafter, the method may end at 340.

If, however, the determined time or distance is less than or equal to the time or distance associated with the medium option at 350, the conformal image that illustrates the medium time or distance (e.g., image 18*e* in FIG. 5B) is generated and the alert display signals 22*b* are generated to alert the driver by displaying conformal image 18*e* at 370. Additionally, the alert display signals 22*b* may cause the conformal image 18*e* to flash or to have modified colors at 370. Thereafter, the method may end at 340.

Figure 13B:
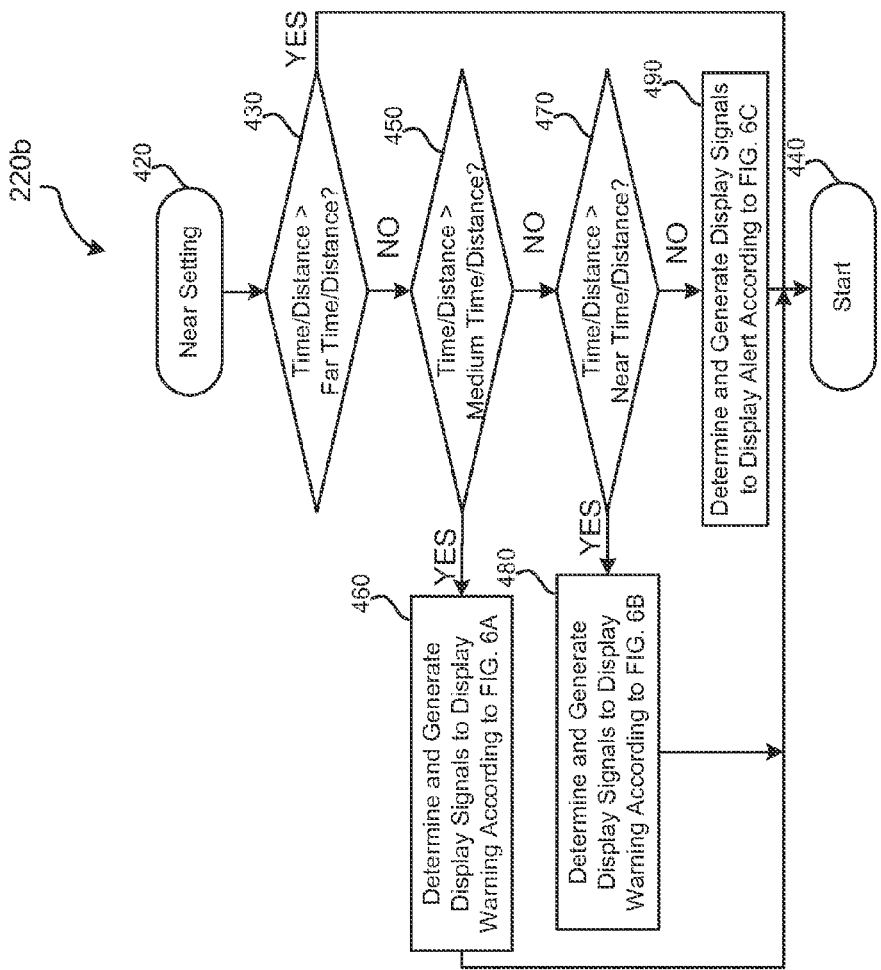
Figure 13A:
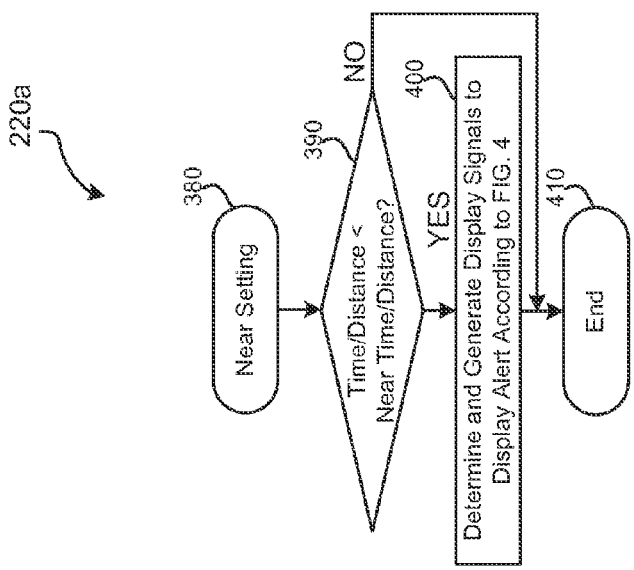

FIGS. 13A and 13B illustrate exemplary methods for determining and generating display signals 22 according to the near option as described at 220 of FIG. 10. FIG. 13A illustrates a method 220*a* of generating alert signals 22*b*. In one example, the method 220*a* may begin at 380. The determined time or distance is compared to the time or distance associated with the near option at 390. If the determined time or distance is less than the time or distance associated with the near option at 390, the conformal image that illustrates the near time or distance (e.g., image 18*c* in FIG. 4) is generated and alert display signals 22*b* are generated to alert the driver by displaying the conformal image 18*c* at 400. Thereafter, the method may end at 410.

If, however, the determined time or distance is greater than or equal to the time or distance associated with the near user settings at 390, no display signals are generated (i.e., no warnings or alerts are generated), and the method may end at 410.

FIG. 13B illustrates a method 220*b* of generating alert signals 22*b* and warning signals 22*a*. In one example, the method 220*b* may begin at 420. The determined time or distance is compared to the time or distance associated with the far option at 430. If the determined time or distance is greater than the time or distance associated with the far option at 430, no display signals are generated (i.e., no warnings or alerts are generated, and the method may end at 440. If, however, the determined time or distance is less than or equal to the time or distance associated with the far option at 430, the determined time or distance is compared to the time or distance associated with the medium option at 450. If the determined time or distance is greater than the time or distance associated with the medium option at 450, the conformal image that illustrates the far time or distance (e.g., image 18*f* in FIG. 6A) is generated and the warning display signals 22*a* are generated to warn the driver by displaying the conformal image 18*f* at 460. Thereafter, the method may end at 440.

If, however, the determined time or distance is less than or equal to the time or distance associated with the medium option at 450, the determined time or distance is compared to the time or distance associated with the near option at 470. If the determined time or distance is greater than the time or distance associated with the near option at 470, the conformal image that illustrates the medium time or distance (e.g., image 18*g* in FIG. 6B) are generated and the warning display signals 22*a* are generated to warn the driver by displaying the conformal image at 480. Thereafter, the method may end at 440.

If, however, the determined time or distance is less than or equal to the time or distance associated with the near option at 470, the conformal image that illustrates the near time or distance (e.g., image 18*h* in FIG. 6C) is generated and the alert display signals 22*b* are generated to alert the driver by displaying the conformal image 18*h* at 490. Additionally, the alert display signals 22*b* may cause the conformal image 18*h* to flash or to have modified colors at 490. Thereafter, the method may end at 440.

Figure 14:
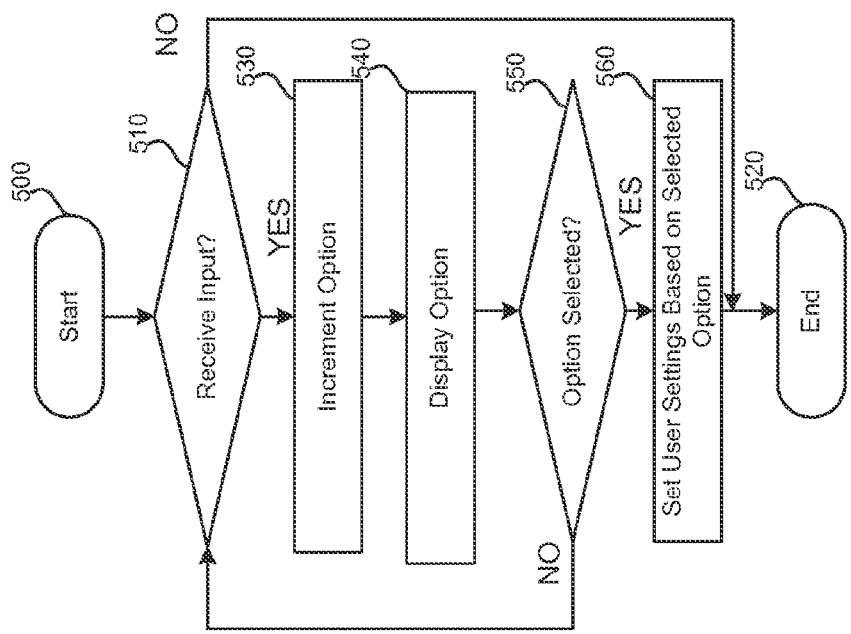

FIG. 14 illustrates an exemplary method for configuring the user settings 32 that are used to determine and generate the display signals 22. As can be appreciated, the method of FIG. 14 may be scheduled to run at predetermined time intervals during operation of the vehicle 10 and/or may be scheduled to run based on predetermined events.

In one example, the method may begin at 500. It is determine whether input indicating to display an option is received at 510. If input is not received at 510, the method may end at 520. If however, input is received at 510, a next option is selected at 530. For example, the next option may begin at no option and may be incremented to one of the far option, the medium option, and the near option based on the current option (e.g., in a round-robin fashion). The option is displayed as a conformal image that illustrates the time or distance associated with the option (e.g. image 18*i*, 18*j*, or 18*k* in FIG. 7, 8, or 9 respective) at 540. If subsequent user input is received indicating that an option is selected at 550, the user settings 32 are set based on the selected option (e.g., the far option, the medium option, and the near option) at 560 and the method may end at 520. If, however, no user input is received indicating that an option is selected at 550, rather the user input indicates to display a next option at 510, the next option is selected at 530 and displayed at 540. The options are incremented and displayed until an option is selected at 550, and the user settings 32 are set at 560.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of alerting a driver of an automobile having a transparent conformal display unit, the method comprising:
   detecting that an object is located in proximity to the automobile based on sensor data;
   determining at least one of a time and a horizontal distance associated with the detected object based on vehicle conditions;
   generating an image where the imagery of the image illustrates the at least one of time and horizontal distance based on vehicle conditions;
   selectively generating an alert display signal and a warning display signal to display the image on a transparent display of the automobile through the transparent conformal display unit, and
   wherein the selectively generating the alert display signal and the warning display signal comprises generating the alert display signal based on a range associated with a selected option and generating the warning display signal based on an option that is not selected.

2. The method of claim 1, wherein the determining the at least one of the time and the horizontal distance comprises determining a time to the object based on at least one of current and projected vehicle conditions.

3. The method of claim 1, wherein the determining the at least one of the time and the horizontal distance comprises determining a horizontal distance required to avoid a collision based on at least one of current and projected vehicle conditions.

4. The method of claim 1, wherein the generating the image comprises generating a conformal image based on vehicle conditions.

5. The method of claim 4, wherein the conformal image conforms to an environment viewed through the windshield.

6. The method of claim 1, further comprising determining that the at least one of time and horizontal distance associated with the object is located within a range, and wherein the generating the image and the selectively generating is in response to the at least one of time and horizontal distance being within the range.

7. The method of claim 6, further comprising setting the range based on a user configured setting.

8. The method of claim 1, wherein the selectively generating the alert display signal and the warning display signal is based on ranges associated with the at least one of time and horizontal distance.

9. A method of alerting a driver of an automobile having a transparent conformal display unit, the method comprising:
   detecting that an object is located in proximity to the automobile based on sensor data; and
   in response to the object being detected, generating a conformal image based on vehicle conditions, and selectively generating an alert display signal and a warning display signal to display the image on a transparent display of the automobile through the transparent conformal display unit, and wherein the selectively generating the alert display signal and the warning display signal comprises generating the alert display signal based on a range associated with a selected option and generating the warning display signal based on an option that is not selected.

10. The method of claim 9, wherein the conformal image conforms to an environment viewed through the transparent display.

11. The method of claim 9, further comprising determining at least one of a time and a horizontal distance associated with the object based on vehicle conditions.

12. The method of claim 11, wherein the determining the at least one of the time and the horizontal distance comprises determining a time to the object based on at least one of current and projected vehicle conditions.

13. The method of claim 11, wherein the determining the at least one of the time and the horizontal distance comprises determining the required to avoid a collision based on at least one of current and projected vehicle conditions.

14. The method of claim 11, wherein the generating the conformal image comprises generating a conformal image that illustrates the at least one of time and horizontal distance based on vehicle conditions.

15. The method of claim 11, further comprising determining that the time or the distance associated with the object is located within a range, and wherein the generating the conformal image and the selectively generating the display signal is further in response to the time or horizontal distance being within the range.

16. The method of claim 15, further comprising setting the range based on a user configured setting.

17. A system for alerting a driver of an automobile, the system comprising:
   a transparent conformal display unit; and
   a control module that detects an object in proximity to the automobile, that determines at least one of a time and a horizontal distance associated with the detected object based on vehicle conditions, that generates a conformal image where the imagery of the image illustrates the at least one of time and horizontal distance based on vehicle conditions, and that selectively an alert display signal and a warning display signal to display the image on a transparent display of the automobile through the transparent conformal display unit, and
   wherein the control module selectively generates the alert display signal and the warning display signal by generating the alert display signal based on a range associated with a selected option and generating the warning display signal based on an option that is not selected.

\* \* \* \* \*